Figure 1:
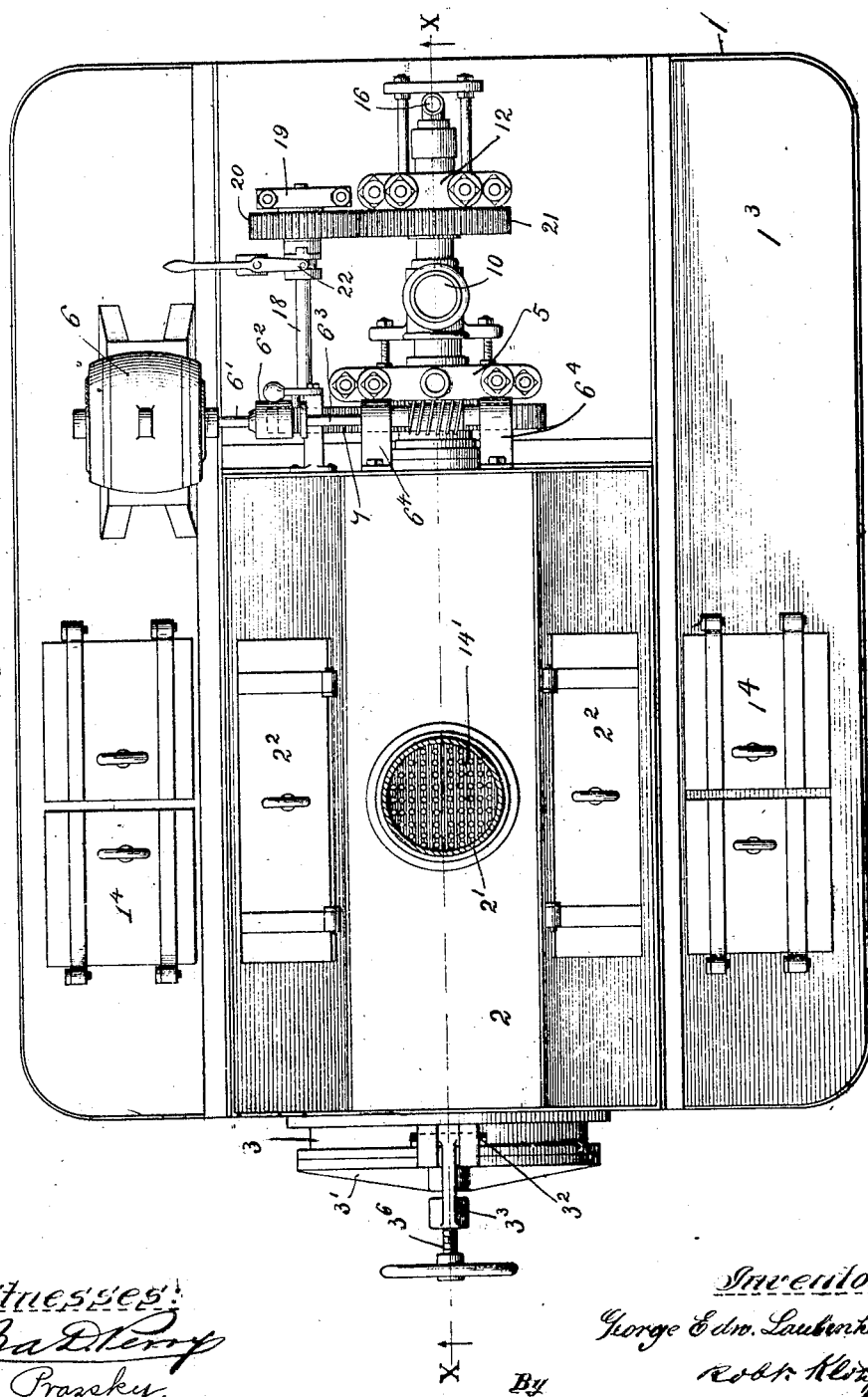

No. 860,390. PATENTED JULY 16, 1907.
G. E. LAUBENHEIMER.
HOP JACK.
APPLICATION FILED FEB. 11, 1907.

3 SHEETS—SHEET 1.

Witnesses:

Inventor:
George Edw. Laubenheimer
Robt. Klotz
Atty.

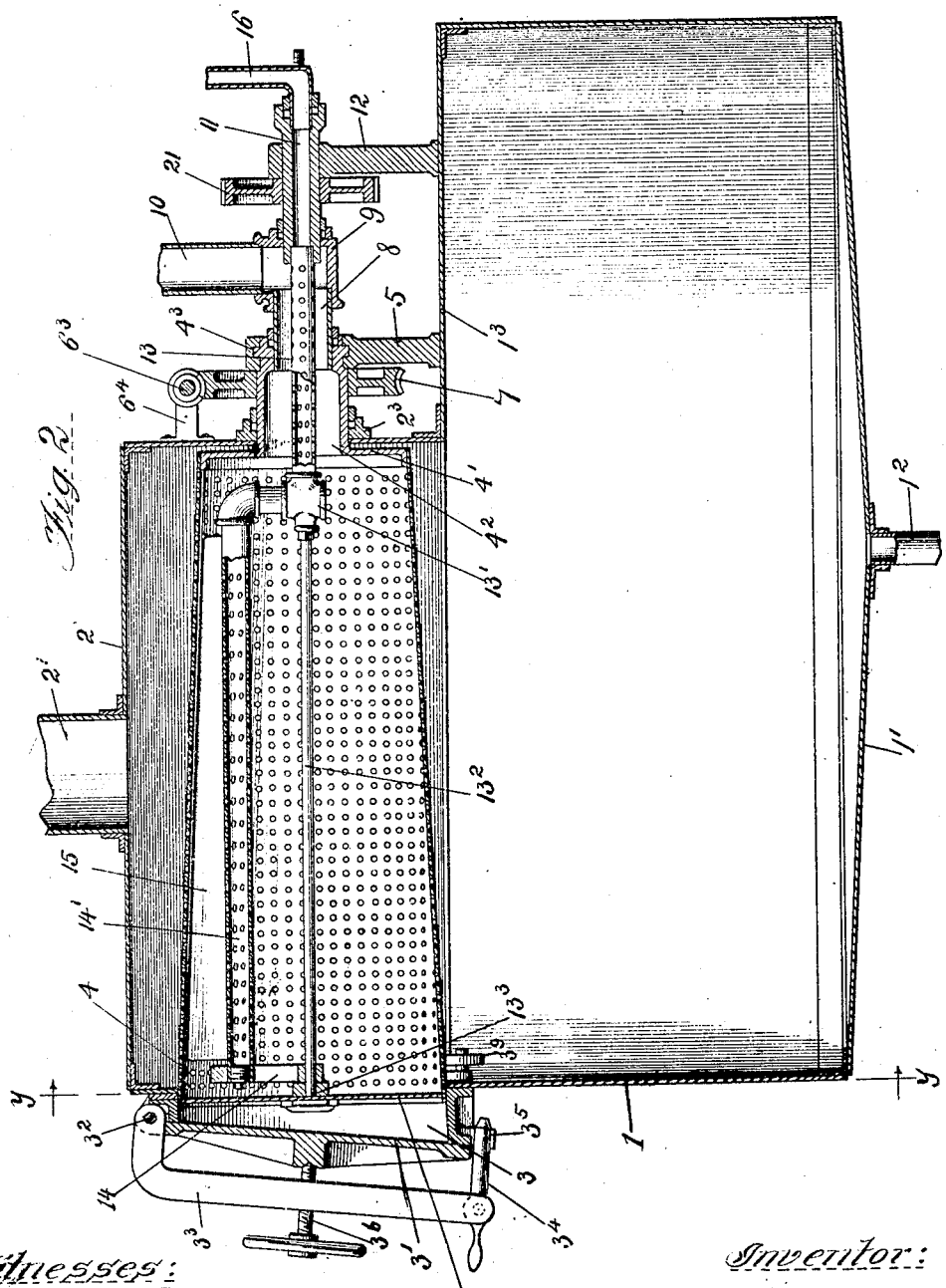

No. 860,390. PATENTED JULY 16, 1907.
G. E. LAUBENHEIMER.
HOP JACK.
APPLICATION FILED FEB. 11, 1907.
3 SHEETS—SHEET 3.
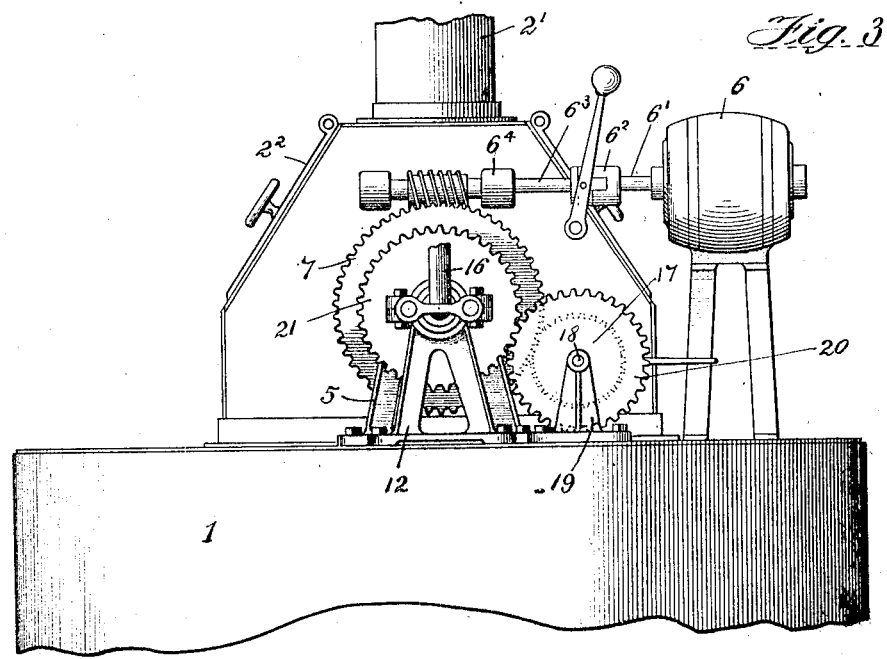
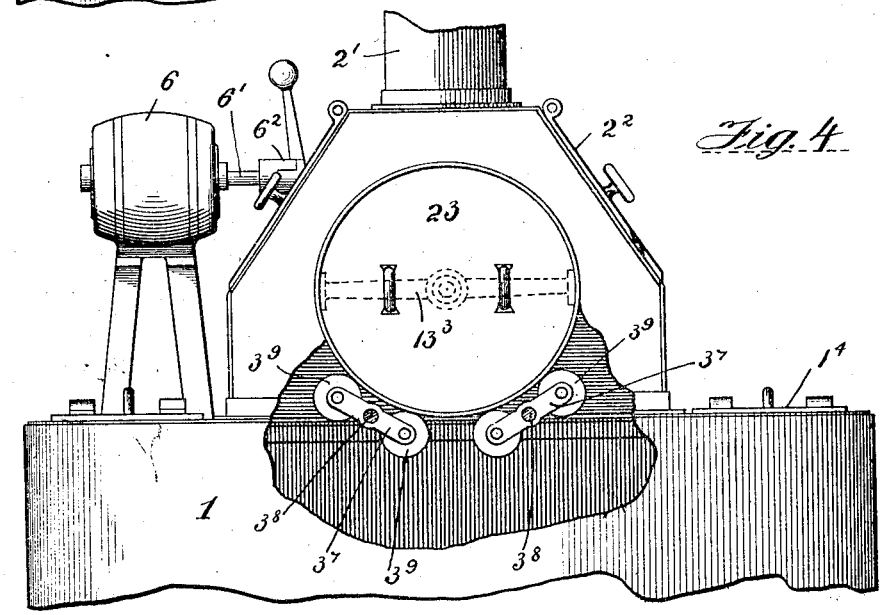
Witnesses:
Inventor:
George Edw. Laubenheimer
By
Atty.

UNITED STATES PATENT OFFICE.

GEORGE EDWARD LAUBENHEIMER, OF CHICAGO, ILLINOIS.

HOP-JACK.

No. 860,390.  Specification of Letters Patent.  Patented July 16, 1907.

Application filed February 11, 1907. Serial No. 356,683.

*To all whom it may concern:*

Be it known that I, GEORGE EDWARD LAUBENHEIMER, a citizen of the United States, residing at Chicago, in the county of Cook and State of Illinois, have invented a new and useful Improvement in Hop-Jacks, of which the following is a complete specification.

This invention relates to improvements in hop jacks and more particularly to a hop jack provided with a revolving screen adapted to separate the hops from the wort.

Heretofore hop jacks have usually been constructed with a perforated false bottom, raised a distance above the bottom of the tank and which serves to separate the hops from the wort. This has been objectionable for various reasons, among which are, first, the difficulty in cleaning the hops off the false bottom after the wort has been separated; second, if the wort is allowed to rise to a point too near to the false bottom, the suction of the pump in drawing off the wort causes particles of the hops which entirely cover the false bottom, to be drawn into the perforations of the bottom thus clogging the same, and third, where the false bottom is employed, and especially in the more recent constructions of breweries where the hop jack is generally placed above the cooler, it often happens that the wort rises above the false bottom and stands in contact with the hops and, if allowed to stand for any length of time, the hops impart to the wort a rank, bitter taste.

The object of this invention is to provide a hop jack in which the screen or strainer is so constructed that the wort quickly drains off and the hops are quickly and thoroughly sparged and removed from the greater portion of the surface of the screen by mechanical means, thereby obviating a great deal of the manual labor usually required where a false bottom is employed.

It is a further object of the invention to provide a device in which the danger of having the hops drawn into the separated wort is entirely avoided, since there is a free passage of air provided from the atmosphere to the tank without passing through the screen.

It is also an object of the invention to provide a hop jack in which the danger of the wort standing too long in contact with the hops is entirely obviated.

The invention consists of the matters hereinafter described in the specification and more fully pointed out and defined in the appended claims.

In the drawings; Figure 1 is a top plan view of a device embodying my invention. Fig. 2 is a section taken on line $x$—$x$ of Fig. 1. Fig. 3 is a fragmentary end elevation of the power end of the device, Fig. 4 is a fragmentary section taken on line $y$—$y$ of Fig. 1.

As shown in said drawings: 1 represents a tank of any preferred size, shape and material, preferably sheet copper, and which is supported in any preferred manner not shown. Said tank is provided with a flaring bottom 1' at the lowest point of which is an outlet pipe 1² as is usual in such devices. A partial cover 1³ is provided which covers all but the central portion of the tank at one end and in which are the doors or lids 1⁴ by means of which access is had to the interior of the tank. Over the uncovered portion of the tank is mounted the screen casing 2 which has no bottom and opens directly into the tank. A vent pipe 2' leads therefrom to the atmosphere and doors 2² open through the sides thereof and afford admission to the screen. At one end of said casing is provided an enlarged opening, as shown more clearly in Figs. 2 and 4, about which is rigidly engaged, on the outer side of the casing, a circular flange 3 into which the adjacent end of the screen 4 extends and which, as shown, is of greater diameter at its outer end than at its inner end. A lid 3' is hinged on a pintle 3² on said flange and is adapted to be held in closed position by means of an arm 3³, which is pivoted on said pintle and extends outwardly and downwardly to the opposite side of the lid. On the lower end of said arm is a catch 3⁴ adapted to engage a suitable lug 3⁵ on the flange and centrally of said arm is a set screw 3⁶ adapted to engage the lid and force it into close contact with the outer edge of the flange. At the opposite end of said casing is provided an opening of smaller diameter than the opening in the front end, but in axial alinement therewith, and surrounding which, on the outer side of the casing is the stuffing box 2³. Said screen 4 may be of any preferred material, preferably copper, and as shown comprises a conical shaped drum, the larger or front end of which projects into the flange 3. Beneath the screen and at each side of the center thereof is pivoted a bar 3⁷ on stud shafts 3⁸ secured to the casing. At the ends of said bars are journaled rollers 3⁹ which support the end of the screen and afford a roller bearing therefor. The rear or smaller end of said screen is provided with a head 4', which is rigidly engaged therein, and is provided with an outwardly directed cylinder affording an axle 4² in axial alinement with the screen, and which extends outwardly through the stuffing box 2³. Said cylinder is provided at its outer end with a peripheral flange 4³ which is seated in a complemental groove in the bearing seat of the bearing standard 5, carried on the cover 1³, and prevents longitudinal movement of the screen while permitting it to rotate freely. Said screen may be operated by any desired power but as shown an electric motor 6 is mounted on the tank and the motor shaft 6' is connected, by means of a suitable clutch 6², with the worm shaft 6³ which is journaled in suitable bearings 6⁴ carried on the end of the casing 2 above the axle 4². A relatively large worm gear 7 is rigidly engaged on the axle 4² and is in mesh with the worm on the worm shaft and transmits the motion thereof to the screen.

Fitting closely in the end of the axle 4² and extending outwardly therefrom is a pipe section 8 which is connected at its outer end in the pipe fitting 9 into one side of which opens the supply pipe 10 leading from the kettle, not shown. Journaled in said fitting and opening thereinto, in axial alinement with the pipe 8, is the hollow shaft 11, the outer end of which is journaled in the bearing standard 12 carried on the top of the tank.

For the purpose of thoroughly removing the wort which has been absorbed by the separated hops a sparger or sprinkler is provided which comprises a perforated pipe 13 rigidly engaged at one end in the inner end of the shaft 11 and at the other end engaged in a pipe fitting 13′ within the rear end of the screen. A shaft 13² is engaged at one end in said fitting 13′ in axial alinement with the pipe 13 and at the other end is journaled in a cross bar 13³ extending across the large or forward end of the screen and rigidly engaged thereto. An arm 14 is rigidly engaged on said shaft adjacent said bar and engaged in the end thereof is the perforated pipe 14′, the other end of which is turned inwardly and engaged in said pipe fitting 13′. Rigidly engaged on said pipe 14′ and extending into close proximity with the screen is the scraper 15 adapted to scrape the hops from the walls of the screen. A hot water pipe 16 leads from any suitable source of supply and is connected in the outer end of the shaft 11, by means affording a tight joint and is adapted to supply hot water to the sparger. For the purpose of rotating said sparger or sprinkler and the scraper, a gear 17, in mesh with the worm gear 7 as shown in dotted lines in Fig. 3, is rigidly engaged on a shaft 18, journaled in suitable standards 19 which are engaged on the top of the tank. A gear 20 is loosely engaged on the shaft 18 and meshes with a gear 21 which is rigidly engaged on the tubular shaft 11. A clutch 22 of any preferred construction acts to lock the gear 20 to the shaft 18 when it is desired to rotate the sparger. The gear 17 is much smaller than the gear 7 as are the gears 20 and 21 and therefore the sparger and scraper are caused to revolve faster than the screen. A door 23 fits closely in the large end of the drum against the bar 13³ and may be secured therein in any preferred manner, not shown.

The operation is as follows: The wort with the contained hops is admitted through the pipe 10 to the screen where the wort escapes through the perforations into the tank, leaving the hops. As soon as the wort is turned into the screen the latter is started revolving thereby distributing the hops over its surface and causing the greater portion of the wort to strain into the tank, and only that remaining which has been absorbed by the hops. The sparger and scraper are then set in motion by means of the clutch 22 and the hops are repeatedly scraped from the walls of the screen and turned over. At the same time hot water is admitted through the pipe 16 and thoroughly sparges the hops thereby removing all the remaining wort. Owing to the conical shape of the screen the hops gradually work towards the larger or front end and when the work has been completely separated the lid 3′ and door 23 are removed and the hops withdrawn from the screen.

I claim as my invention:

1. In a device of the class described the combination with a tank of a casing thereon, having a flanged opening in one end, a conically shaped screen having one end thereof rotatively engaged in said opening and an extension on the opposite end projecting through the end of the casing, a bearing for said extension, a worm gear on said extension, a worm shaft adapted to rotate said gear, a perforated pipe extending into said extension, an axial shaft connected therewith at one end and at the other supported in the opposite end of the cylinder, an arm on said shaft, a sparger connected at one end in said arm and at the other end to said perforated pipe, a scraper on said sparger and means for rotating said sparger and scraper.

2. In a device of the class described the combination with a tank of a casing thereon, having an opening in one end thereof, an outwardly directed flange surrounding said opening, a conical screen rotatively engaged at its large end in said flange, bars pivoted on the tank beneath said opening, rollers thereon affording a bearing for said screen, means affording a bearing for the opposite end of the screen, a removable head in the large end of the screen, a perforated pipe extending into the small end of the screen, a shaft connected in the end of said pipe and extending axially of the screen, a cross bar in the large end of said screen affording a bearing for said shaft, an arm on said shaft, a sparger connected at one end to said arm and at the other to said perforated pipe, a scraper on said sparger and means for rotating the screen and sparger at different rates of speed.

3. In a device of the class described the combination with a tank of a casing thereon having an opening in one end, an outwardly directed flange about said opening, a lid adapted to close said opening, a pivoted arm adjacent said lid, means thereon adapted to engage the flange, a set screw in said arm adapted to engage the lid and hold it in place, bars pivoted at the bottom of the opening, a roller on each end of said bars, a conically shaped screen supported at its larger end on said rollers and projecting into the flange, a removable head in the large end of the screen, an extension on the small end of the screen projecting through the wall of the casing, a bearing therefor, a perforated pipe extending into said extension, a sparger connected therewith, a scraper on said sparger and means for rotating said screen and sparger at different rates of speed.

4. In a device of the class described the combination with a tank of a casing thereon having an opening in one end, an outwardly directed, peripheral flange about said opening, a lid adapted to fit closely on said flange and close said opening, a pivoted arm adapted to lock said lid in closed position, a conically shaped screen journaled at its larger end in said opening and having an extension on the small end projecting through the end of the casing, a removable head in the large end of the screen, bars pivotally engaged on the tank beneath the large end of the screen, rollers thereon affording roller bearings for the screen, a bearing for said extension, a worm gear on said extension, a worm shaft adapted to drive the same, and rotate the screen, a pipe section connected in the end of said extension, an inlet pipe opening thereinto, a tubular shaft opening axially into said pipe extension, a bearing therefor, a hot water pipe opening into the outer end of said tubular shaft, a perforated pipe connected in the inner end of said tubular shaft and extending axially of said extension into the screen, a shaft connected at one end therein, a cross bar in the large end of the screen adapted to support the opposite end of the shaft, an arm on said shaft adjacent said bar, a perforated pipe connected at one end to said arm and at the other to the aforesaid perforated pipe, a straight edged scraper on said last named perforated pipe and means for driving said perforated pipes and scraper at a different rate of speed than said screen.

5. In a hop jack, the combination with a tank of a conical screen journaled thereon, a shaft journaled at one end at the front end of said screen and extending axially thereof to near the rear end, a perforated pipe connected with said shaft and extending outwardly from the screen, a tubular shaft connected with said perforated pipe, a bearing therefor, a hot water pipe opening into said tubular shaft, a perforated pipe connected with the aforesaid perforated pipe and extending parallel with 14′ the shaft, a straight edged scraper on the last named pipe and means for rotating said cylinder and perforated pipes at different rates of speed.

6. In a hop jack the combination with a tank of a casing thereon having a door at one end, a conically shaped perforated drum in said casing, roller bearings therefor at its front end, a door in its front end adjacent the door in the casing, an axial cylinder at the other end thereof projecting from the casing, a bearing therefor, an inlet pipe opening into said cylinder, a worm gear rigidly engaged on said cylinder, a worm shaft connected therewith, a bearing standard carried on said tank, a tubular shaft journaled therein, a perforated pipe rigidly engaged in said shaft and extending axially of said cylinder, a shaft connected thereto and journaled at the front end of the screen, a perforated pipe supported thereon and communicating with the aforesaid pipe, a scraper on said last-named pipe, a hot water pipe opening into said tubular shaft, clutch controlled means driven by the worm gear adapted to rotate said tubular shaft and perforated pipes and means for driving the worm shaft.

In testimony whereof, I have signed my name to this specification in the presence of two subscribing witnesses.

GEORGE EDWARD LAUBENHEIMER.

Witnesses:
JOE MILLER,
A. PRAZSKY.